United States Patent [19]

Sasaki et al.

[11] Patent Number: 4,980,439
[45] Date of Patent: Dec. 25, 1990

[54] METHOD FOR MANUFACTURING AN ALKENYL GROUP-CONTAINING ORGANOPOLYSILOXANE

[75] Inventors: Shosaku Sasaki, Ichihara; Hiroshi Masaoka, Saitama, both of Japan

[73] Assignee: Toray Silicone Company Limited, Tokyo, Japan

[21] Appl. No.: 412,706

[22] Filed: Sep. 26, 1989

[30] Foreign Application Priority Data

Sep. 28, 1988 [JP] Japan ................................ 63-242898

[51] Int. Cl.$^5$ .............................................. C08G 77/06
[52] U.S. Cl. ........................................ 528/14; 528/33; 528/34; 528/18
[58] Field of Search ................... 528/33, 34, 14, 18

[56] References Cited

U.S. PATENT DOCUMENTS 4,609,574  9/1986  Keryk et al. .................... 427/407.1

FOREIGN PATENT DOCUMENTS 62-86061  2/1987  Japan .

OTHER PUBLICATIONS

*Chemistry and Technology of Silicones*, 2nd Ed., Water Noll, 1968, pp. 388-391.

*Primary Examiner*—Melvyn I. Marquis
*Attorney, Agent, or Firm*—George A. Grindahl

[57] ABSTRACT

The method of the present invention provides for the manufacturing of an alkenyl group-containing organopolysiloxane using an alkali catalyst in the presence of oxygen and in the absence of carbon dioxide. The copolymer is characterized by a viscosity of at least 500 cst at 25° C., can be efficiently manufactured and is free of gelation. In the method an organopolysiloxane represented by the average formula $R^1{}_aSiO_{(4-a)/2}$ in which $R^1$ is a monovalent hydrocarbon group free of aliphatic unsaturation and a 4-8 carbon atom alkenyl group-containing organopolysiloxane represented by the average formula $R^2{}_bR^3{}_cSiO_{(4-b-c)/2}$ are copolymerized.

7 Claims, No Drawings

METHOD FOR MANUFACTURING AN ALKENYL GROUP-CONTAINING ORGANOPOLYSILOXANE

BACKGROUND OF THE INVENTION

The present invention concerns a method for manufacturing an alkenyl group-containing organopolysiloxane.

There are conventionally known organopolysiloxanes, which contain alkenyl groups in the molecule, as in the case of dimethylpolysiloxane. For example, Walter Noll notes an alkenyl group-containing (e.g., vinyl group, etc.) organopolysiloxane in *Chemistry and Technology of Silicones* (Academic Press, 1968).

It is a well-established fact that an organopolysiloxane that contains an alkenyl group containing 3 or fewer carbon atoms can be copolymerized under conditions identical to those for polymerizing dimethylpolysiloxane. For example, a methylvinylsiloxane tetramer and dimethylsiloxane tetramer can be copolymerized in a nitrogen atmosphere in the presence of a potassium hydroxide catalyst at 120 to 170° C. for 4 to 8 hours. The resulting siloxane copolymer can also be manufactured in the presence of an acidic clay catalyst in a nitrogen atmosphere at 70 to 110° C. for 10 to 30 hours. It is also a well-established fact that an organopolysiloxane that contains an alkenyl group containing 4 or more carbon atoms, and which is characterized by a viscosity of 310 centistokes (cst) or above at 25° C. can be copolymerized in the air in the presence of an alkali catalyst; see Japanese Kokai Patent No. Sho 62(1987)-86061.

It was discovered that, if an organopolysiloxane that contains an alkenyl group containing 4 or more carbon atoms is copolymerized using an alkali catalyst (e.g., potassium hydroxide, etc.) in a nitrogen atmosphere, gelation is induced. If said alkenyl group-containing organopolysiloxane is manufactured using an acidic catalyst (e.g., acidic clay, etc.), it is impossible to completely remove said acid catalyst from a high-viscosity product. Thus, the heat resistance deteriorates. It was also discovered that an organopolysiloxane that contains an alkenyl group containing 4 or more carbon atoms, and which is characterized by a viscosity of 300 cst or above at 25° C. cannot be copolymerized in the air in the presence of an alkali catalyst.

The present inventors compiled exhaustive research to eliminate the aforementioned problems inherent to conventional methods. Thus, the present invention has been completed. The present invention, which has been proposed to eliminate the aforementioned problems, provides a method for manufacturing an alkenyl group-containing organopolysiloxane in which copolymerization can be quickly induced in the presence of an alkali catalyst, without inducing gelation.

BRIEF SUMMARY OF THE INVENTION

The aforementioned objective of the present invention can be attained by a method for manufacturing an alkenyl group-containing organopolysiloxane, which is characterized by a viscosity of 500 cst or above at 25° C., in which (A) an organopolysiloxane represented by the average formula $R^1_aSiO_{(4-a)/2}$ in which $R^1$ is a monovalent hydrocarbon group free of aliphatic unsaturation and a is a number of from 1.90 to 2.05, and (B) an alkenyl group-containing organopolysiloxane represented by the average formula $R^2_bR^3_cSiO_{(4-b-c)/2}$ in which $R^2$ is a monovalent hydrocarbon group free of aliphatic unsaturation; b is a number of from 0.95 to 2.00; c is a number of from 0.50 to 1.05; b+c is a number from 1.5 to 3.0; and $R^3$ is an alkenyl group containing 4 to 8 carbon atoms are copolymerized using an alkali catalyst in an atmosphere containing the presence of oxygen and the absence of carbon dioxide.

DETAILED DESCRIPTION OF THE INVENTION

The organopolysiloxane used as component (A) is represented by the following average compositional formula.

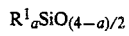

$$R^1_aSiO_{(4-a)/2}$$

In said formula, $R^1$ is a monovalent hydrocarbon group free of aliphatic unsaturation. Examples of such groups include alkyl groups (e.g., methyl, ethyl, propyl, etc.); aryl groups (e.g., phenyl, naphthyl, etc.); aralkyl groups (e.g., 2-phenylethyl, 2-phenylpropyl, etc.), and halogen-substituted groups (e.g., 3,3,3-trifluoropropyl, etc.). Small quantities of hydroxyl groups or alkoxy groups may also be present in the molecule. a is a number of 1.90 to 2.05.

The degree of polymerization of the organopolysiloxane used as the present component must be at least 3. There are no special restrictions on the upper limit of the degree of polymerization, but in consideration of the copolymerizing reactivity with component (B), the degree of polymerization should be 3 to 100. The molecule structure may be linear or cyclic.

Examples of compounds that can be used as the present component include dimethylpolysiloxane in which both ends are capped by hydroxyl groups; cyclic polydimethylsiloxane, polydimethylsiloxane in which both ends are capped by trimethylsiloxy groups; poly(methylphenyl)siloxane in which both ends are capped by hydroxyl groups; and dimethylsiloxane-methylphenylsiloxane copolymer in which both ends are capped by hydroxyl groups. The aforementioned compounds may be used either alone or in combination of two or more.

The alkenyl group-containing organopolysiloxane used as component (B) is represented by the following average compositional formula.

$$R^2_bR^3_cSiO_{(4-b-c)/2}$$

In said formula, $R^2$ is a monovalent hydrocarbon group free of aliphatic unsaturation. As such, groups delineated above for $R^1$ can be appropriately used. $R^3$ is an alkenyl group containing 4 to 8 carbon atoms, and as such,

—(CH$_2$)$_3$CH=CH$_2$, —(CH$_2$)$_4$CH=CH$_2$,

—(CH$_2$)$_5$CH=CH$_2$, —(CH$_2$)$_6$CH=CH$_2$,

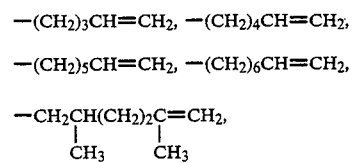

etc., can be used. An alkenyl group containing 8 or more carbon atoms is undesirable since the present component cannot be easily copolymerized with the organopolysiloxane used as component (A). If an alkenyl group containing fewer than 4 carbon atoms is used, and if the resulting copolymerized alkenyl group-containing organopolysiloxane is addition-reacted with methylhydrogenpolysiloxane in the presence of a platinum-containing compound, the reaction rate is inevitably low.

b is a number of 0.95 to 2.00, c is a number of 0.50 to 1.05 and b+c is a number from 1.5 to 3.0. The degree of polymerization of the organopolysiloxane used as the present component should be at least 2. There are no special restrictions on the upper limit of the degree of polymerization, but in consideration of the copolymerizing reactivity with component (A), the degree of polymerization should b ⓡ2 to 100. The molecular structure may be linear or cyclic.

Concrete examples of compounds that can be used as the present component include poly(methyl-5-hexenyl)-siloxane in which both ends are capped by hydroxyl groups; poly(methyl-3-heptenyl)siloxane in which both ends are capped by hydroxyl groups; poly(methyl-7-octenyl)siloxane in which both ends are capped with hydroxyl groups; cyclized poly(methyl-3-heptenyl)-siloxane, cyclized poly(methyl-5-hexenyl)siloxane, cyclized poly(methyl-7-octenyl)siloxane, 1,3-bis(5-hexenyl)tetramethyldisiloxane, dimethylsiloxane-methyl-3-heptenylsiloxane copolymer in which both ends are capped by 5-hexenyldimethylsiloxy groups. The aforementioned compounds may be used either alone or in combination of two or more.

There are no special restrictions on the mixing ratio between component (A) and component (B), and said ratio can be freely selected in consideration of various objectives as long as the viscosity of the copolymerized alkenyl group-containing organopolysiloxane is 500 cst or above at 25° C. and that at least two alkenyl groups are present in the molecule.

As the alkali catalyst used in the manufacturing method of the present invention, conventional catalysts can be appropriately used. Concrete examples of said catalysts include alkali metal hydroxides (e.g., potassium hydroxide, sodium hydroxide, lithium hydroxide, cesium hydroxide, etc.) and alkali metal silanolates (e.g., sodium trimethylsilanolate, potassium trimethylsilanolate, etc.). There are no special restrictions on the quantity of the catalyst, but in consideration of the polymerization rate and the alkali catalyst-neutralizing efficiency after the polymerization process, the catalyst (as alkali metal) with respect to 100 parts by weight of the combined weights of the organopolysiloxanes used as components (A) and (B) should be 0.001 to 0.05 parts by weight.

When the manufacturing method of the present invention is implemented, the aforementioned organopolysiloxane used as component (A) and alkenyl group-containing organopolysiloxane used as component (B) are copolymerized using said alkali catalyst in the presence of oxygen and in the absence of carbon dioxide. Unless oxygen is present, gelation is inevitably induced during the copolymerization process. If carbon dioxide is present, on the other hand, it is impossible to induce copolymerization.

The expression "in a virtual absence of carbon dioxide" signifies a state comparable to a state in which carbon dioxide has been removed using an aqueous sodium hydroxide solution trap. The expression "in the presence of oxygen" indicates an oxygen-containing atmosphere. Best results are obtained with an atmosphere obtained by adding at least 4 vol% of oxygen to an inert gas. Examples of said inert gases include nitrogen, helium, neon, argon, etc. In particular, nitrogen is ideal with regards to accessibility. As the present atmosphere, an atmosphere obtained by removing water and carbon dioxide from air can also be used.

When the copolymerization is implemented, a mixture that contains component (A), component (B), and the alkali catalyst is agitated in an open system while an oxygen-containing inert gas is being continuously permeated. In an alternative format, said copolymerization is induced in an agitated hermetic system. If said hermetic system is used, the oxygen concentration should be lower than that in the aforementioned open system in which the oxygen-containing inert gas is permeated, although the space of the polymerization container must also be taken into consideration. There are no special restrictions on the pressure of the aforementioned gas, and adequate results are obtained at normal pressure.

It is impossible to unidimensionally define the optimum polymerization temperature since it depends on the types of quantities of alkali catalysts. In consideration of the productivity, however, the temperature should be 80 to 130° C. Even if the temperature is lower than 80° C., polymerization can be somehow induced, but in this case, an extremely long period of time is required for completing the polymerization. Thus, the productivity deteriorates. If the temperature exceeds 130° C., on the other hand, the results tend to be affected by the agitation intensity. In other words, if agitation is insufficient, gelation tends to be induced. There are no special restrictions on the polymerization time, but the polymerization should be continued until a certain constant viscosity is attained or until the viscosity variation has reached a state of equilibrium. Under normal circumstances, 3 to 30 hours would suffice. When copolymerization is induced, an organic solvent (e.g., toluene, xylene, etc.) and small quantities of radical polymerization inhibitors may also be added.

The alkenyl group-containing organopolysiloxane, which has been obtained as a result of the aforementioned procedures can be used without any after-treatments, but the alkali catalyst in the resulting polymerization product should be neutralized to stabilize the organopolysiloxane. As neutralizing agents, conventional additives (e.g., acetic acid, carbon dioxide (i.e., dry ice), ammonium chloride, phosphoric acid, dimethylchlorosilane, trimethylchlorosilane, etc.) can be used.

The alkenyl group-containing organopolysiloxane obtained in the manufacturing method of the present invention is a copolymer consisting of organopolysiloxane units attributed to component (A), and organopolysiloxane units attributed to component (B). The degree of polymerization of the resulting alkenyl group-containing organopolysiloxane depends on the triorganosiloxy group concentrations of copolymerized components (A) and (B), as well as the polymerization time. For example, a polymer with a viscosity of 500 cst at 25° C. and a gum-like polymer can be equally manufactured. If triorganosiloxy groups are present in component (A) and/or component (B), the resulting alkenyl group-containing organopolysiloxane is characterized by a molecular structure in which both end groups are capped by triorganosiloxy groups. If alkoxy groups or hydroxyl groups are present in component (A) and/or component (B), the resulting alkenyl group-containing organopolysiloxane is characterized by a chained or cyclic molecule structure in which both end groups are capped by alkoxy groups or hydroxyl groups.

The alkenyl group-containing organopolysiloxane obtained in the manufacturing method of the present invention can be used as a feed material for manufacturing various curable resins since said alkenyl groups are highly reactive.

In the paragraphs to follow, the contents of the present invention will be explained in further detail with reference to application examples. In subsequent application examples, the expression "%" signifies "vol%" unless otherwise indicated. The viscosity is a value at 25° C. The quantities of the alkali catalyst and its neutralizing agent (ppm) are computed with respect to the entire quantity of siloxane.

REFERENCE EXAMPLE 1

After 307.5 g (3.75 mol) of 1,5-hexadiene and 0.025 g of chloroplatinic acid had been placed into a 1 L three-necked flask with an agitation mechanism, the contents were agitated. Subsequently, 172.5 g (1.5 mol) of methylhydrogendichlorosilane were added dropwise into the resulting mixture for approximately 1 h. After the addition was completed, the contents were agitated and reacted at 76° C. for 2 h.

Then, the resulting reaction mixture was distilled at 80° C. and at a reduced pressure of 190 mm Hg. Thus, 252 g of methyl-5-hexenyldichlorosilane were obtained. After said reaction product had been added to a liquid mixture of 400 g of toluene and 200 g of toluene, the contents were sufficiently agitated and hydrolyzed. After the resulting mixture had been left to stand, the aqueous layer was removed. After the remaining toluene layer had been washed with 200 g of water, the aqueous layer was removed once again. The aforementioned water-washing procedures were repeated three times. After 30 g of sodium carbonate had been added to the resulting water-washed toluene layer, the contents were sufficiently agitated, and the resulting mixture was filtered through a filter paper. After toluene had been distilled and removed from the resulting filtered solution at high temperature and reduced pressure, 164 g of a liquid with a viscosity of 10 cst were obtained.

$^1$H-NMR and $^{13}$C-NMR analyses revealed that the resulting liquid was a mixture of 5-hexenylmethylpolysiloxane, in which both ends were capped with hydroxyl groups and cyclized 5-hexenylmethylpolysiloxane.

APPLICATION EXAMPLES 1 AND 2

In Application Example 1, the following procedures were carried out. After 97.5 parts by weight of cyclized dimethylsiloxane tetramer and 2.5 parts by weight of the 5-hexenylmethylpolysiloxane obtained in Reference Example 1 had been placed into a 1 L three-necked flask with an agitation mechanism, 150 ppm of potassium hydroxide were added to the resulting mixture, and the contents were agitated and copolymerized at 110°–115° C. for 5 h, while a mixture of 5% of oxygen and 95% of nitrogen gas was being continuously permeated. After the resulting reaction mixture had subsequently been cooled, 250 ppm of acetic acid (i.e., catalyst-neutralizing agent) were added. Then, the contents were sufficiently agitated. After volatile components had been distilled and removed from the resulting mixture at 120° C. and 5 mm Hg, a 5-hexenylmethylsiloxane-dimethylsiloxane copolymer rubber with a plasticity of 1.59 (sample 1) was obtained (5-hexenylmethylsiloxane unit content: 1.32 mol%; dimethylsiloxane unit content: 98.68 mol%).

In Application Example 2, copolymerization procedures identical to those in Application Example 1 were carried out except that the quantities of the cyclized dimethylsiloxane tetramer and the 5-hexenylmethylpolysiloxane obtained in Reference Example 1 were changed to 94.5 parts by weight and 5.5 parts by weight, respectively. As a result, a 5-hexenylmethylsiloxane-dimethylsiloxane copolymer rubber with a plasticity of 1.50 (sample 2) was obtained (5-hexenylmethylsiloxane unit content: 2.94 mol%; dimethylsiloxane unit content: 97.06 mol%).

Both samples 1 and 2 were homogeneously dissolved in toluene, which indicates that the copolymerization process was unaccompanied by gelation.

In Comparative Examples 1 and 2, copolymerization procedures identical to those in Application Examples 1 and 2 were carried out, except that only nitrogen gas was permeated instead of the mixture of 5% of oxygen and 95% of nitrogen gas. As a result, gelation was induced during the copolymerization process, and the gelled organopolysiloxane was insoluble in toluene.

REFERENCE EXAMPLE 2

After 495 g (4.5 mol) of 1,7-octadiene and 0.03 g of chloroplatinic acid had been placed into a 1 L three-necked flask equipped with an agitation mechanism, the contents were agitated. Subsequently, 172.5 g (1.5 mol) of methylhydrogendichlorosilane were added dropwise into the resulting mixture for approximately 1.5 h. After the addition had been completed, the temperature was raised to 80° C. Then, the contents were agitated and reacted at said temperature for approximately 2 h. Then, the resulting mixture was distilled at 80° C. and at a reduced pressure of 80 mm Hg. Thus, 284 g of methyl-7-octenyldichlorosilane was obtained.

After said reaction product had been added to a liquid mixture of 400 g of toluene and 200 g of toluene, the contents were sufficiently agitated and hydrolyzed. After the resulting mixture had been left to stand, the aqueous layer was removed. After the remaining toluene layer had been washed with 200 g of water, the aqueous layer was removed once again. The aforementioned water-washing procedures were repeated three times. After 30 g of sodium carbonate had been added to the resulting water-washed toluene layer, the contents were sufficiently agitated, and the resulting mixture was filtered through a filter paper. After toluene had been distilled and removed from the resulting filtered solution at high temperature and reduced pressure, 186 g of a liquid with a viscosity of 12 cst were obtained.

$^1$H-NMR and $^{13}$C-NMR analyses revealed that the resulting liquid was a mixture of 7-octenylmethylpolysiloxane, in which both ends were capped with hydroxyl groups and cyclized 7-hexenylmethylpolysiloxane.

APPLICATION EXAMPLES 3 AND 4

In Application Example 3, the following procedures were carried out. After 95 parts by weight of cyclized dimethylsiloxane tetramer and 5 parts by weight of the octenylmethylpolysiloxane obtained in Reference Example 2 had been placed into a 1 L three-necked flask equipped with an agitation mechanism, 150 ppm of potassium hydroxide were added to the resulting mixture, and the contents were agitated and copolymerized at 115°–120° C. for 6 h, while a gas that had been obtained by removing carbon dioxide and water from the air (by permeating air through a 5 wt% aqueous sodium hydroxide solution and a calcium chloride tube) was being continuously permeated. After the resulting reaction mixture had been cooled, dry ice (i.e., catalyst-neutralizing agent) was added. Then, the contents were sufficiently agitated. After volatile components had been distilled and removed from the resulting mixture at 120° C. and 5 mm Hg, a 7-octenylmethylsiloxane-dimethylsiloxane copolymer rubber with a plasticity of 1.52 (sample 3) was obtained.

In Application Example 4, copolymerization procedures identical to those in Application Example 3 were carried out, except that 160 ppm of sodium hydroxide was added instead of potassium hydroxide, and that polymerization was carried out at 1 20°-125° C. for 18 h. As a result, a 7-octenylmethylsiloxane-dimethylsiloxane copolymer rubber with a plasticity of 1.48 (sample 4) was obtained.

Both samples 3 and 4 were homogeneously dissolved in toluene, which indicates that the copolymerization process was unaccompanied by gelation.

In Comparative Examples 3, attempts were made to induce copolymerization under conditions identical to those in Application Example 3 using 9-decenylmethylpolysiloxane, which had been prepared according to procedures identical to those for manufacturing the 7-octenylmethylpolysiloxane of Reference Example 2. As a result, only a white opaque mixture was obtained, and it was impossible to manufacture a copolymer.

In Comparative Example 4, procedures identical to those in Application Example 3 were carried out except that air that had not passed through a 5 wt% aqueous sodium hydroxide solution and a calcium chloride tube (carbon dioxide concentration: 400 ppm) was continuously permeated. There was no viscosity increase even after 36 h, and it was impossible to manufacture a copolymer.

REFERENCE EXAMPLE 3

After 400 g of toluene and 0.08 g of a platinum-1,3-divinyl-1,1,3,3-tetramethyldisiloxane complex had been placed into a 1 L three-necked flask equipped with an agitation mechanism, the contents were agitated. After the temperature of the resulting mixture had been raised to 50°–55° C., 115 g (1.0 mol) of methylhydrogendichlorosilane were added dropwise into the resulting mixture for approximately 1.5 h while 1,3-butadiene gas was being continuously permeated. After the addition had been completed, the temperature was raised to 75° C. for approximately 3 h. Then, the contents were agitated for an additional hour.

After the temperature of the resulting mixture had been lowered to room temperature, 200 g of water were added to said mixture. Then, the contents were sufficiently agitated and hydrolyzed. After the resulting mixture had been left to stand, the aqueous layer was removed. After the remaining toluene layer had been washed with 200 g of water, the aqueous layer was removed once again. The aforementioned water-washing procedures were repeated three times. After 20 g of sodium carbonate had been added to the resulting water-washed toluene layer, the contents were sufficiently agitated, and the resulting mixture was filtered through a paper filter. After toluene had been distilled and removed from the resulting filtered solution at high temperature and reduced pressure, 129 g of a liquid with a viscosity of 10 cst were obtained. $^1$H-NMR and $^{13}$C-NMR analyses revealed that the resulting liquid was 3-butenyl-methylpolysiloxane.

APPLICATION EXAMPLE 5

After 94 parts by weight of cyclized dimethylsiloxane tetramer, 4.5 parts by weight of the butenylmethylpolysiloxane obtained in Reference Example 3, and 1.5 parts by weight of decamethyltetrasiloxane had been mixed together, the contents were agitated. Then, 160 ppm of potassium hydroxide were added to the resulting mixture, and the contents were agitated and copolymerized at 115°–120° C. for 6 h while a gas that had been obtained by removing carbon dioxide and water from the air (by permeating air through a 5 wt% aqueous sodium hydroxide solution and a calcium chloride tube) was being continuously passed. After the resulting reaction mixture had been cooled, 300 ppm of acetic acid (i.e., catalyst-neutralizing agent) were added. After volatile components had been distilled and removed from the resulting mixture at 120° C. and 5 mm Hg, a butenylmethyldimethylpolysiloxane copolymer rubber with a viscosity of 3,500 cst (sample 5) was obtained.

Sample 5 was homogeneously dissolved in toluene, which indicates that the copolymerization process was unaccompanied by gelation.

In Comparative Examples 5, copolymerization procedures identical to those in Application Example 5 were carried out except that nitrogen gas was used in place of modified air. As a result, gelation was induced during the copolymerization process, and it was impossible to manufacture the objective polysiloxane.

REFERENCE EXAMPLE 4

After 410 g (5 mol) of 1,5-hexadiene and 0.035 g of chloroplatinic acid had been placed into a 1 L three-necked flask equipped with an agitation mechanism, the contents were agitated. Then, 134 g (1 mol) of tetramethyldisiloxane were added dropwise into the resulting mixture for approximately 1.5 h while the temperature was being gradually raised to 80° C. Then, the contents were reacted at 80° C. for an additional 2 h. After unreacted components had been distilled and removed from the resulting mixture at 80° C. and 3 mm Hg, 178 g of di(5-hexenyl)tetramethyldisiloxane were obtained. $^1$H-NMR and $^{13}$C-NMR analyses revealed that the objective product had been synthesized.

APPLICATION EXAMPLES 6 AND 7

After 98.55 parts by weight of cyclized dimethylsiloxane tetramer and 1.45 parts by weight of the di(5-hexenyl)tetramethyldisiloxane obtained in Reference Example 4 had been mixed together, 150 ppm of potassium hydroxide were added to the resulting mixture. Then, the contents were agitated and copolymerized at 100°–105° C. for 7 h while a gas that had been obtained by removing carbon dioxide and water from air (by permeating air through a 5 wt% aqueous sodium hydroxide solution and a calcium chloride tube) was continuously permeated. After the resulting reaction mixture had been cooled, 300 ppm of acetic acid (i.e., catalyst-neutralizing agent) were added, and the contents were sufficiently agitated. After the resulting mixture had been filtered using a filter press, volatile components were distilled and removed at 120° C. and 10 mm Hg. Thus, a dimethylpolysiloxane, in which both ends had been capped by 5-hexenyldimethylsiloxane groups (viscosity: 990 cst) (sample 6) was obtained.

Next, copolymerization procedures identical to those in Application Example 6 were carried out except that the quantities of the cyclized dimethylsiloxane tetramer and di(5-hexenyl)tetramethyldisiloxane were changed to 97.6 parts by weight and 2.4 parts by weight, respectively. As a result, a dimethylpolysiloxane in which both ends had been capped by 5-hexenyldimethylsiloxane groups (viscosity: 350 cst) (sample 7) was obtained.

After methylhydrogenpolysiloxane had been added to sample 6 or 7, a subsequently-siloxane complex was added to the resulting mixture. As a result, the mixture was quickly cured in each case. Thus, it was determined that hexenyl groups had been bonded with both ends.

APPLICATION EXAMPLE 8

After 90 parts by weight of cyclized dimethylsiloxane tetramer and 6.5 parts by weight of cyclized methylphenylsiloxane, 3 parts by weight of the 5-hexenylmethylpolysiloxane obtained in Reference Example 1, and 0.5 parts by weight of the di( 5-hexenyl)tetramethyldisiloxane obtained in Reference Example 4 had been mixed together, 140 ppm of potassium hydroxide were added to the resulting mixture. Then, the contents were agitated and copolymerized at 110°–115° C. for 6 h while a gas that had been obtained by removing carbon dioxide and water from air (by permeating air through a 5 wt% aqueous sodium hydroxide solution and a calcium chloride tube) and by mixing the resulting gas with nitrogen gas (oxygen cn: 15%) was being continuously permeated.

After the resulting reaction mixture had been cooled, an aqueous ammonium chloride solution (i.e., catalyst-neutralizing agent) was added, and the contents were sufficiently agitated. After the resulting mixture had been filtered using a filter press, volatile components were distilled and removed at 120° C. and 10 mm Hg. Thus, a hexenylmethylsiloxane-phenylmethylsiloxane-dimethylsiloxane copolymer in which both ends had been capped by 5-hexenyldimethylsiloxane groups (viscosity: 9,600 cst) (sample 8) was obtained. Sample 8 was homogeneously dissolved in toluene, which indicates that the copolymerization process was unaccompanied by gelation.

In Comparative Example 6, copolymerization procedures identical to those in Application Example 8 were carried out, except that nitrogen gas was used in place of the gas containing 15% of oxygen. As a result, gelation was induced, and it was impossible to manufacture the objective copolymer.

EFFECTS OF THE INVENTION

When the method of the present invention for manufacturing an alkenyl group-containing organopolysiloxane is implemented, organopolysiloxane component (A) and alkenyl group-containing organopolysiloxane component (B) are copolymerized using an alkali catalyst in the presence of oxygen and in the absence of carbon dioxide. As a result, no gelation is induced during the copolymerization process, and an alkenyl group-containing organopolysiloxane, which consists of organopolysiloxane units attributed to component (A) and organopolysiloxane units attributed to component (B), and which is characterized by a viscosity of at least 500 cst at 25° C., can be efficiently manufactured.

That which is claimed is:

1. A method for manufacturing an alkenyl group-containing organopolysiloxane which is characterized by a viscosity of 500 cst or above at 25° C. in which
   (A) an organopolysiloxane represented by the average formula $R^1{}_a SiO_{(4-a)/2}$ in which $R^1$ is a monovalent hydrocarbon group free of aliphatic unsaturation and a is a number of from 1.90 to 2.05, and
   (B) an alkenyl group-containing organopolysiloxane represented by the average formula $R^2{}_b R^3{}_c SiO_{(4-b-c)/2}$ in which $R^2$ is a monovalent hydrocarbon group free of aliphatic unsaturation; b is a number of from 0.95 to 2.00; c is a number of from 0.50 to 1.05; b+c is a number from 1.5 to 3.0; and $R^3$ is an alkenyl group containing 4 to 8 carbon atoms are copolymerized using an alkali catalyst in an atmosphere containing the presence of oxygen and the absence of carbon dioxide.

2. A method in accordance with claim 1 wherein component (A) is a dimethylpolysiloxane.

3. A method in accordance with claim 1 wherein component (B) is a methyl-5-hexenylpolysiloxane.

4. A method in accordance with claim 1 wherein the alkali catalyst is an alkali metal hydroxide or an alkali metal silanolate.

5. A method in accordance with claim 1 wherein the atmosphere is air from which carbon dioxide has been removed using an aqueous sodium hydroxide solution trap.

6. A method in accordance with claim 1 wherein the atmosphere is obtained by adding at least 4 vol% of oxygen to an inert gas.

7. A method in accordance with claim 1 wherein the alkali catalyst in the polymerization product is neutralized to stabilize the organopolysiloxane.

* * * * *